(12) United States Patent
Richards et al.

(10) Patent No.: US 6,770,174 B1
(45) Date of Patent: Aug. 3, 2004

(54) PHOTOCHEMICAL SYSTEM AND METHOD FOR REMOVAL FOR FORMALDEHYDE FROM INDUSTRIAL PROCESS EMISSIONS

(75) Inventors: John R. Richards, Durham, NC (US); David G. Goshaw, Chapel Hill, NC (US)

(73) Assignee: Air Control Techniques, P.C., Cary, NC (US)

( * ) Notice: Subject to any disclaimer, the term of this patent is extended or adjusted under 35 U.S.C. 154(b) by 204 days.

(21) Appl. No.: 10/098,759

(22) Filed: Mar. 14, 2002

(51) Int. Cl.⁷ .............................. B01D 53/00; A62D 3/00

(52) U.S. Cl. .................................... 204/157.3; 588/219

(58) Field of Search ....................... 204/157.3; 588/219

(56) References Cited

U.S. PATENT DOCUMENTS 4,203,735 A * 5/1980 Colombo et al. ............. 95/109

* cited by examiner

Primary Examiner—Edna Wong
(74) Attorney, Agent, or Firm—Coats & Bennett, PLLC

(57) ABSTRACT

An adsorption-desorption photochemical oxidation process for destroying formaldehyde within an industrial process effluent gas stream is disclosed. The process includes an adsorption-desorption step to concentrate the formaldehyde into a seprate gas stream. The desorbed formaldehyde is oxidized in a photochemical reactor using ultraviolet light. The frequency of light in one embodiment is set at a spectral range of from 220 to 370 nanometers. A conventional wet scrubber is included downstream to control the effluent gas stream from the photochemical reactor. Formaldehyde that escapes the adsorption removal step is directly photolyzed using ultraviolet light in the spectral range of 220 to 370 nanometers.

30 Claims, 2 Drawing Sheets

US 6,770,174 B1

PHOTOCHEMICAL SYSTEM AND METHOD FOR REMOVAL FOR FORMALDEHYDE FROM INDUSTRIAL PROCESS EMISSIONS

FIELD OF THE INVENTION

The invention is directed to industrial process emission control for industrial waste gas containing formaldehyde. Specifically, the invention is directed to an adsorption, desorption-photochemical oxidation (ADPO) system for minimizing formaldehyde levels in the gaseous effluent.

BACKGROUND OF THE INVENTION

Formaldehyde is a ubiquitous, hazardous pollutant emitted from a variety of large-scale industrial processes, including wood processing, furniture manufacturing, painting and coating, textile production, and cement manufacturing processes. Industrial processes emitting hazardous materials are regulated subject to reporting and mandated abatement requirements. Formaldehyde is a known carcinogen and subject to U.S. Environmental Protection Agency "Maximum Achievable Control Technology" (MACT) standards. Large-scale plants that emit in excess of 10 tons of formaldehyde annually are classified as major sources under these MACT standards.

Incineration is a high-energy process and often leads to non-benign secondary emissions such as nitrogen oxides (NOx) and unburned hydrocarbons. Photocatalysis systems are relatively capital intensive to install and require high maintenance to avoid degrading efficiencies and treatment reliability. Other techniques lead to secondary wastes and leave the ultimate fate of the pollutants unresolved. A technique is needed that can reliably treat chemical pollutants in a cost-effective manner.

Known methods to reduce formaldehyde emissions include eliminating the sources from raw materials, incineration, activated carbon-bed adsorption, adsorption on zeolite supports, and aerogels and adsorption techniques in conjunction with photocatalytic destruction. Obvious drawbacks of incineration include the cost of fuel and additional treatment of CO and NOx emissions. Costs incurred in the use of activated carbon include disposal and/or recovery costs in handling spent activated carbon. Captured volatile organic compounds (VOC) are not destroyed as they are retained only by a physical adsorption mechanism since chemisorption mechanisms are not provided in the use of activated carbon.

The costs associated with the addition and recovery of exogenous photocatalysts introduced to a waste stream containing VOC are obvious. Avoidance of specially adapted substrates would be desirable especially in industrial processes with very high effluent volume and with relatively low concentrations of VOC. Also, catalytic methods involve exothermic reactions, and are sometimes accompanied by over oxidation from the favored attack of partially oxidized products over the starting VOC.

The current commercial technology for reducing $SO_2$ and $NO_x$ emissions from power plants is wet scrubbing. Wet scrubbing generates hazardous slurry wastes. Dry sorbent injection technologies produce dry hazardous wastes. The dry sorbents are injected into a conventional power plant either in the combustion furnace (870–1200° C.), the economizer outlet (300–400° C.), or the air preheater outlet ducts (120–200° C.). Typical sorbents include finely ground limestone, dolomite, hydrated lime, sodium bicarbonate, and sodium sesquicarbonate. Known use of dry sorbents reacted with $SO_2$ emissions forming solid products, such as $CaSO_4$ or $Na_2SO_4$, are then removed with the coal ash or with the dust by the particulate matter collection system, e.g., electrostatic precipitator or baghouse, depending on the point of injection.

Photochemical destruction of VOC is known. U.S. Pat. No. 3,977,952 discloses a process for the decomposition of one or more carbon-containing compounds such as in an industrial waste or flue gas containing VOC, oxygen and water vapor. The method is carried out by exposing humidified gas to radiation of a wavelength of about 20 to 600 nanometers.

In some industrial processes, such as pyroprocessing of cement, recovery of the particulate solids to the production produce is of economic importance. A discussion of dry sorption methods is found in U.S. Pat. No. 6,080,281 teaching an emission control process using photocatalytic and nonphotocatalytic aerogels for adsorption, and exposing the photocatalytic aerogel material containing adsorbed VOC to ultraviolet (UV) radiation resulting in their destruction.

U.S. Pat. No. 4,210,503 discloses a direct photolysis method for controlling gaseous emissions, and particularly vinyl chloride, by exposing the emissions to UV light and, thereafter, absorbing such decomposition products in a scrubber which substantially eliminates the vinyl chloride and most other decomposition products from the effluent stream.

U.S. Pat. No. 4,981,650 discloses a method to remove dioxin-contaminated waste by way of extraction in a liquid capable of extracting dioxins. A hydrogen donor is added to the extracting solvent or later on during addition of an activating agent. The dioxin-containing liquid extract is treated in a direct photolysis reactor which contains immersion UV lamps.

U.S. Pat. No. 5,045,88 discloses the removal of halogenated and non-halogenated volatile and non-volatile organic contaminants from a gaseous stream by mixing a gaseous oxygen bearing substance with the contaminated gaseous stream, contacting the mixture with a solid photocatalyst; and exposing the photocatalyst and organic components to UV light having a wavelength up to 600 nanometers. The catalyst is pre-selected to prevent formation of a liquid phase.

U.S. Pat. No. 5,417,825 discloses a thermal photolytic process that utilizes high temperatures in combination with radiation exposure to induce a photochemical reaction to detoxify a wide variety of organic pollutants, for example, chlorinated aromatic hydrocarbons. The hydrocarbons are treated in the gaseous phase by heating to a temperature greater than 200° C., preferably 600–800° C., and exposing the heated gas to radiation at wavelengths of less than 280 nanometers, preferably from 185 nanometers to 280 nanometers, for at least two seconds.

U.S. Pat. No. 5,650,549 teaches a photothermal process for the detoxification of chlorinated aromatic hydrocarbons contained in a gas stream comprising the steps of: heating chlorinated aromatic hydrocarbons to a temperature of greater than 200° C. to form a gas stream or maintaining a pre-existing chlorinated aromatic hydrocarbon containing gas stream produced from a combustion source at a temperature of greater than 200 ° C. and exposing the gas stream to radiation at a wavelength of less than 280 nanometers for at least one second to convert said chlorinated aromatic hydrocarbons nontoxic reaction products, and releasing said gas stream to the atmosphere.

U.S. Pat. No. 5,839,078 discloses a method of direct vitrification of nuclear waste comprising the steps of providing waste in the form of relatively small pieces with vitrifiable material, providing high intensity light source of sufficient power to cause melting and subsequent vitrification of said waste; and, cooling and storing said vitrified material.

U.S. Pat. No. 5,342,582 discloses an apparatus for reprocessing special wastes of photopolymerizable scrap material to produce domestic waste, comprising a housing equipped with a feed hopper, at least one UV emitter arranged in the housing to irradiate and heat the scrap material, and a chopper arranged in the housing to comminute the scrap material. The photocrosslinkable and thermally crosslinkable scrap is composed of, for example, dry resist, solder resist, color proof films, screen printing films, and the like, which form special waste because of their reactive constituents.

U.S. Pat. No. 5,476,975 discloses a method for photodegradation of a solution of organic toxic chemicals recoverable from contaminated wood products by the use of a supercritical fluid, by exposing the extracted solution to UV, in the presence of a photosensitizer.

U.S. Pat. No. 5,935,525 discloses a pre-treatment system and an air treatment system for abatement of contaminated air that includes pollutants such as VOC, NOx, and/or CO. The air stream is treated using UV light under conditions that produce hydroxyls, peroxides, and other oxidants without the formation of ozone. These oxidants are also utilized in the activated air, with the activated water being formed as an aqueous solution (vapor) of the activated air. The pre-treatment system includes a quenching zone where activated water is misted into the air stream, followed by alternating reaction zones and depletion zones where activated air is added and then turbulently mixed with the air stream. The air treatment system includes a primary treatment tunnel, carbon bed system, activated air generator, and a sparger tank farm. Activated air produced by the generator as added into water while being exposed to UV light in the sparger tank farm. Then, as the contaminated air stream moves through various sequential chambers within the tunnel, it is subjected to the misted activated water, while being simultaneously exposed to UV radiation. Air exiting the tunnel is then further treated in the carbon bed system.

U.S. Pat. No. 6,179,971 discloses a two-step process for air purification comprising a photolytic step followed by a photocatalytic step, each of which entail radiation treatment to convert contaminants into less harmful products. The method provides a photolytic stage having a source of UV radiation; and a downstream photocatalytic stage using a photocatalyst and source of UV radiation.

U.S. Pat. No. 5,538,537 discloses a method of desulfurizing furnace flue gases laden with $SO_2$ comprising: cooling the flue gases to a temperature near but above the dew point thereof; and flowing the cooled flue gases through a bed of granular cement stone sorbent prepared from a mixture of cement and water. The sorbent laden with pollutants from the flue gases can be further processed directly in an advantageous manner in a cement plant, for example by grinding it together with cement clinker or separately therefrom and thereby adding it as a component, for example as a gypsum component, to a cement which is to be produced, so that no disposal problems exist for sorbent laden with pollutant. With the addition of ashes or fly ashes from coal or fluosolids furnaces a particularly environmentally friendly means for disposal of these ashes can be achieved simultaneously if a sorbent laden with pollutants from the flue gases is further processed for the production of cement (together with cement clinker). Sorbent is produced, it is advantageous to use it with a grain size of >1 mm, preferably approximately 4 to 20 mm. A mixture of granulated cement stone and carbonaceous sorption material then forms the sorbent used according to the invention which is brought into contact with flue gases which are to be purified.

U.S. Pat. No. 4,634,583 discloses a method for the desulfurization of a calcium containing flue gas stream from a firing system such as a cement-making plant wherein at least partially deacidified, hot raw cement meal is added to the flue gas at selected points to adsorb the sulfur oxides to the calcium present in the gas. No additional adsorption agents, for example, activated carbon, pure calcium oxide, milk of lime, or the like are used. Raw cement meal having an adequately high proportion free calcium oxide is conveyed to the conduit of the exhaust gas to be desulfurized. The preferred method comprises suspending the deacidified raw cement meal in the flue gas in the form of a cloud of airborne dust, and thereafter separating the dust from the flue gas after the sulfur oxides have been bonded to the calcium.

U.S. Pat. No. 5,137,704 discloses a process for decreasing NOx content of exhaust gases from cement-burning kilns by an addition of ammonia and/or ammonia-containing substances to the hot exhaust gases, the exhaust gases are desulfurized at a temperature from 50° to 100° C. in a dry or semidry process by a mixture of raw cement powder and calcium hydroxide. The mixed solids that have been removed from the exhaust gas in a dry state in the desulfurizing stage are returned to the exhaust gas stream when it is a temperature from 850° to 1,000° C.

Treatment methods for pollutant bearing gas in a corona discharge device is a known method of removing the pollutants. A general review of this technique is provided in Puchkarev et al., "Toxic Gas Decomposition by Surface Discharge," Proceedings of the 1994 International Conf. on Plasma Science, Jun. 6–8, 1994, Santa Fe, N.Mex., paper No. 1E6, page 88. Corona discharge systems used for removal of mercury are disclosed in U.S. Pat. No. 5,591,412.

Injection of activated carbon in waste gas effluent is known. See U.S. Pat. Nos. 4,196,173; 4,889,698; 5,053,209; 5,607,496; and 5,672,323.

Copending U.S. application Ser. No. 09/847,476 filed May 2, 2001 now U.S. Pat. No. 6,541,677 discloses a process for detoxifying polychlorinated dibenzo-p-dioxins and dibenzofurans (PCDD-PCDF) contained in an industrial gas stream. In a Stage I treatment, irradiation of particulate matter-laden gas stream emitted from the industrial process as the gas passes through a particulate matter filtering device to destroy precursors of PCDD-PCDF. In a Stage II treatment, filtered gas from Stage I enters irradiating a filtered gas stream with light in spectral range of 290 to 500 nanometers, in the absence of absence of added photocatalyst results in the direct photolytic dechlorination of PCDD-PCDF in the vapor phase.

SUMMARY OF THE INVENTION

In a basic aspect, the invention provides a multi-stage method for reduction or removal of formaldehyde from an industrial waste gas effluent stream, comprising introducing finely divided particulate solids containing an organic component into a gaseous effluent stream, adsorbing formaldehyde onto the solids, separation of the gas from the particulate solids, contacting the particulate solids in a hot gas desorption step using a separate gas stream, irradiating the hot gas containing desorbed formaldehyde and the effluent gas stream to convert formaldehyde to less hazardous chemical species.

In another aspect, the present invention involves irradiation of an in-line gaseous formaldehyde-containing effluent after having been mixed with particulate adsorbent solids and the adsorbent has been removed. In this case, the irradiation destroys formaldehyde that was not adsorbed on the adsorbent. The irradiation employed has a frequency in the UV range and is readily adjusted in accord with the teaching herein. The treatment of formaldehyde with radiation in accordance with the invention is especially efficient when employing UV sources that emit in the spectral range of 220 to 370 nanometers under conditions typically encountered in industrial effluent gases containing less than 100 ppm of formaldehyde. The preferred intensity and frequency of the radiation taught herein results in the rapid and efficient direct photolytic destruction of formaldehyde prior to release of the effluent gas stream to the atmosphere.

In a general component aspect, an industrial production process which emits a gaseous effluent stream containing formaldehyde is coupled to a Stage I formaldehyde reduction method, the method comprising:
  a) introduction of solid particulates into a gaseous effluent gas stream from the process to form a gas-solid mixture, the solid particulates containing an organic component for the adsorption of formaldehyde;
  b) recovering solid particulate matter with adsorbed formaldehyde from the gas-solid mixture;
  c) generating desorbed recovered solid particulates by desorbing formaldehyde into a second gas stream;
  d) oxidizing formaldehyde in the second gas stream containing desorbed formaldehyde by direct photochemical oxidation in the absence of added photocatalyst by irradiating the gas stream with UV light; and
  e) returning desorbed solid particulates to said process and/or the removal method.

In accordance with another aspect of the invention in an industrial production process that emits a gaseous effluent stream containing formaldehyde, a Stage II formaldehyde reduction method is provided, the method comprising:
  a) introduction of solid particulates into a gaseous effluent stream from said process to form a gas-solid mixture, said solid particulates containing an organic component which adsorbs formaldehyde;
  b) forming a filtered gas stream from the separation of solid particulates from said gas-solid mixture; and
  c) oxidizing formaldehyde in said filtered gas stream by direct photochemical oxidation of formaldehyde in the absence of added photocatalyst by irradiating the filtered gas stream with ultraviolet light.

In accordance with a third aspect of the invention there is provided a coupled Stage I and II (S-I, S-II) process for the removal of formaldehyde from an industrial process having a gaseous effluent stream which contains formaldehyde, a removal method comprising:
  a) introduction of solid particulates into a first effluent gas stream to form a gas-solid mixture, said solid particulates containing an organic component which adsorbs formaldehyde from the effluent gas stream;
  b) separating said gas-solid mixture into recovered solid particulates and a filtered first gas stream;
  c) oxidizing formaldehyde in said filtered first gas stream by direct photochemical oxidation in the absence of added photocatalyst, (S-II) by irradiating the filtered first gas stream with ultraviolet light to form an irradiated first filtered gas stream;
  d) contacting a heated second gas stream with said recovered particulates thereby desorbing formaldehyde into the heated second gas stream; and
  e) oxidizing formaldehyde in said second gas stream by direct photochemical oxidation, in the absence of added photocatalyst (S-I) by irradiating the second gas stream with UV light, to form an irradiated second gas stream.

In a fourth aspect, the invention resides in a method to remove formaldehyde from an effluent gas emitted from an industrial process which also emits finely divided byproduct solids, the method comprising introducing the byproduct solids into the effluent gas stream, adsorbing formaldehyde on to the solids, recovering the solids from the gas stream by a particulate matter control device, desorbing formaldehyde from the solids into a hot gas stream, irradiating the hot gas stream to reduce the formaldehyde content, and recovering the solids to the industrial process.

In a fifth aspect, the invention includes a method for pryoprocessing of cement raw feed comprising a pyroprocessing step including directing raw feed to a kiln to produce cement clinker, directing the pyroprocessing gas effluent into a mixing zone, mixing the gas with finely divided particulate solids previously recovered from pyroprocessing, adsorbing formaldehyde onto the finely divided solids, desorbing formaldehyde in a desorption zone by contactng with a flow of hot gas, irradiating the hot gas reducing the level of formaldehyde therein, and irradiating the filtered pyroprocessing gas effluent reducing the level of formaldehyde therein, and returning the solids or the treated gas to the industrial process.

Various specific and/or preferred aspects are specified hereinbelow, and other objects and advantages of the present invention will become apparent and obvious from a study of the following description and the accompanying drawings that are merely illustrative of such invention,

DETAILED DESCRIPTION OF THE PREFERRED EMBODIMENTS

Figure 1:
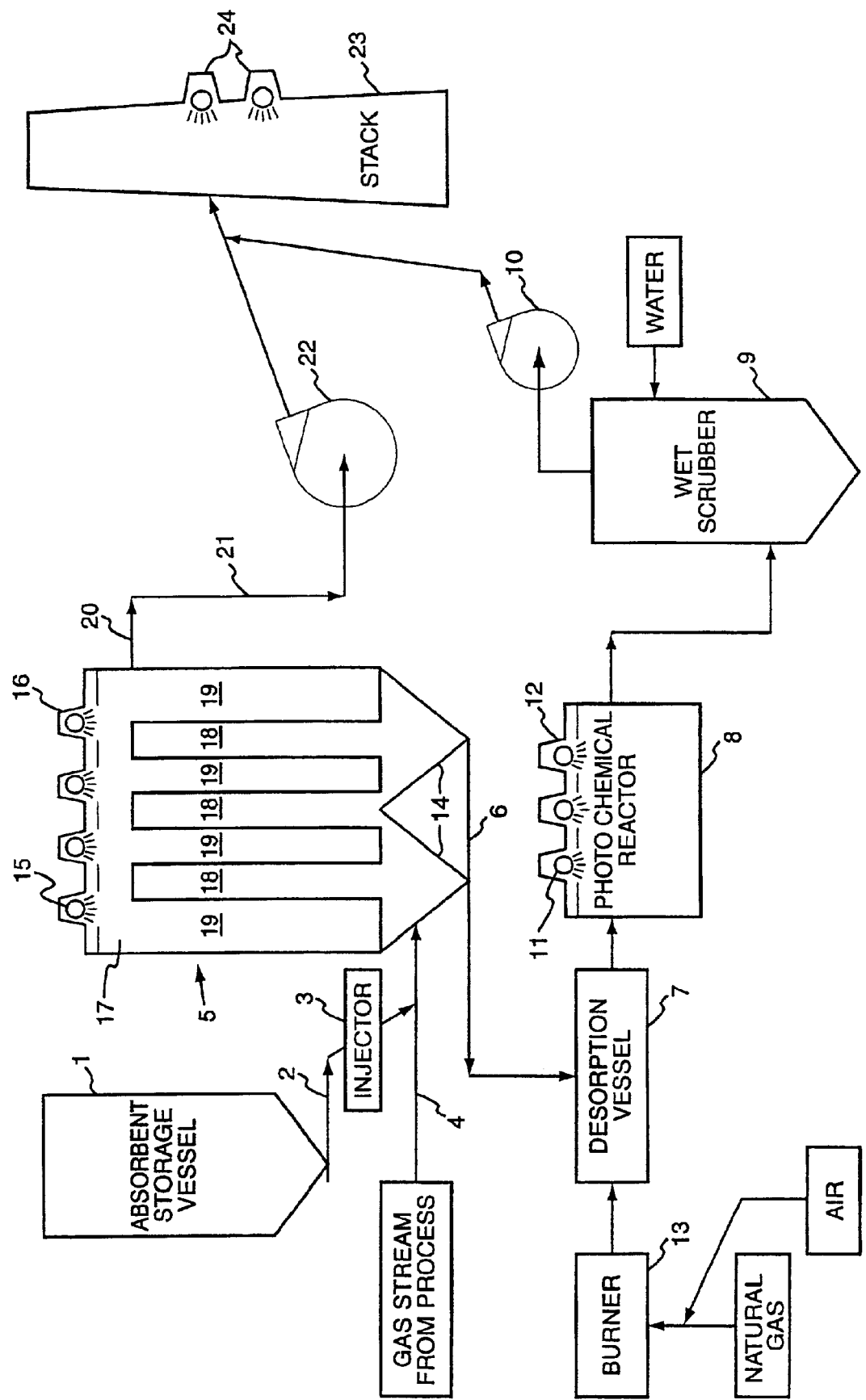
FIG. 1 is a schematic illustration of the ADPO process of the present invention illustrating the removal of formaldehyde compounds from an industrial process effluent gas stream.

The present invention relates to an ADPO process for remediation of formaldehyde in an industrial effluent gas stream. As will be discussed in more detail, the processes entailed in the present invention include the adsorption of formaldehyde on particulate solid materials which contain an organic formaldehyde adsorbing component, introduction of the particulate solids into the effluent gaseous stream, separation of the solids from the gas, desorption of the formaldehyde contained in the sorbed particulate solids into a second separate gas stream to typically provide a concentration of formaldehyde levels of from about 5 to 40 ppm in the effluent stream up to about 100 to 400 ppm in the second gas stream, and the direct photolysis of formaldehyde in the concentrated gas. Reducing the concentration of formaldehyde by a factor of 5, preferably by a factor of 10 and its destruction provided in this aspect of the process consumes relatively little additional energy, can utilize hot gases, gases heated from heat exchangers, or gases heated by burners. The overall process is efficient when coupled to the return of valuable solid materials to the industrial process and can achieve maximum achievable control technology standards.

The ADPO process is applicable to a number of industrial processes, such as portland cement plants and fiberboard production plants. In the case of cement plants, the present invention entails irradiating the effluent gas stream that passes from the pyroprocessing system of the cement plant. In this regard, the gas streams are treated in a Stage I and Stage II control with irradiated light falling within the spectral range of 220 to 370 nanometers. Stage II control is characterized by the direct, nonphotocatalyzed photolysis of formaldehyde after the effluent gas stream has been treated by removal of particulate solids by high efficiency particulate matter control apparatus. By irradiating the gas stream after filtration of solids, the light effectively penetrates gas stream. Optionally further photolysis of particulate matter-laden gas prior to filtration can be included. Direct photolytic irradiation to convert formaldehyde entrained in, or formed in high temperature areas of the pyroprocessing system is more readily controlled and optimized under predetermined treatment control parameters according to the invention, such as gas temperature, flow rate, irradiation dosage and residence time. Any reaction products and unreacted formaldehyde can be collected in a wet scrubber after photochemical degradation, and/or additional irradiation in the exit pathway leading to the atmosphere.

The removal method combines adsorption of formaldehyde onto finely divided particulate solids, thereby reducing the concentration of formaldehyde in the effluent gas stream. Direct photolysis of the effluent stream exiting the filtration apparatus that captures the particulate solids in the adsorbed condition is termed Stage II control. Formaldehyde captured by adsorption onto the particulate solids is desorbed by contacting the solids with a flowing heated gas stream in a desorption vessel. The heated gas stream exiting the desorption vessel contains elevated formaldehyde levels and the gas stream undergoes direct photochemical oxidation of formaldehyde in what is referred to as Stage I control. The desorbed residue of the particulate solids are recovered.

"Particulate solids" are solids comprising an inorganic component and a loss-on-ignition component, for example, an organic component; excludes solely activated carbon; and includes particulate matter emitted or otherwise isolated and recovered at any point in a primary industrial production process. The preferred source of particulate solids are those recovered from an industrial process which is coupled to the instant formaldehyde removal method disclosed herein. Particulate solids, include such materials as mill scale and high loss-on ignition boiler ash, or any by-product or raw feed particles used or recovered from the process which emits such or particles recovered from any secondary source or process, including combinations of separately sourced particulate solids that may be used as an adsorbent.

The loss-on-ignition component of the particulate solids can be a partially decomposed organic residue, a byproduct, waste organic matter, impurity or tramp organic contaminant, or any combination of organic components associated with the inorganic component providing a formaldehyde adsorption moiety in the particulate solids. Preferably, the organic component of the particulate materials is a residue from the primary industrial process to which the removal methods are applied herein. Particulate solids that comprise inorganic and organic components are suitable solid adsorbents, and include, for example, inorganic particles processed through a combustion effluent, high loss-on-ignition boiler ash, and/or any other suitable finely divided particulates containing an inorganic and an organic component. A portion or all of the organic component can be combustible, but is not necessarily completely combustible. The removal method is especially adapted to recover valuable raw material components for re-utilization in the production process.

Injection of particulate solids having a temperature less than that of the effluent stream at the point of injection favors adsorption from the effluent stream, and partially cools the effluent passing forward to the particulate matter control device.

Particulate matter control devices coupled to irradiation sources, employed herein are preferably high efficiency filters and can be selected from among several conventional devices, such as electrostatic precipitators, reverse gas filters, and pulse jet fabric filters. A preferred filter media consists of a plurality of elongated filter bags installed in a filter bag housing, spaced apart and parallel to one another. Preferably the bags are aligned vertically with the openings directed downward to treat gas flowing in an upward direction. Irradiation sources are placed immediately on the downstream side of (e.g., above) the filter bags and positioned to emit radiation through the length of the intervening free spaces. The radiation beams are generally directed parallel to the bags in the preferred embodiment, as depicted in FIG. 1.

Conventional UV irradiating sources are employed. The radiation source may comprise any conventionally generated UV radiation. Radiation in a spectral range of 220 to 370 nanometers is preferred in Stage I and II treatments, such as by lamps with arc emission such as xenon, mercury, or xenon-mercury, or the source may comprise a pulsed or continuous laser. Other available sources of UV light may be used as long as they provide radiation in the above-specified range. The source of radiation may be located outside the irradiation zones and emitted through sealed quartz windows protruding through the structural wall of the zones. Preferably the source of radiation is located inside the photochemical zone.

The adsorption, desorption, and photochemical oxidation mechanism for destroying desorbed formaldehyde in a concentrated gas stream is termed Stage I control. In Stage I control, upon injection of particulate solids and mixing with the process effluent gas, and retention of the particulate solids in the particulate matter control device, the captured solids containing adsorbed formaldehyde are treated so as to release or desorb formaldehyde. In one embodiment of the desorption step, a hot gas stream is used to desorb formaldehyde. The particulate solids are returned to the industrial process to conserve valuable raw materials and to minimize solid waste generation.

The captured solids containing adsorbed formaldehyde are treated to drive off substantially all of the formaldehyde desorbed by exposure to hot gas heated for, example, in a natural gas burner or in the case of cement pyroprocessing, an alkali bypass slip stream may be employed. The formaldehyde desorbed from the adsorbent is then photochemically oxidized in a photochemical reactor designed to optimize the desired photolysis reactions and to minimize undesirable photochemical reactions. The lights used in the photochemical reaction zones have effective spectral output for treating formaldehyde in the range of 220 to 370 nanometers.

The number of UV emitting devices used in Stage I processing in treatment of elevated formaldehyde levels resulting from desorption, for example, of cement pyroprocessing effluent can vary in relation to the heated gas flow rate, residency time, and concentration of formaldehyde and other VOC in the gas stream. A recommended intensity range is from 200 to 2,000 microwatts/cm$^2$ measured at 254 nanometers and 1,000 to 20,000 microwatts/cm$^2$ measured at 360 nanometers. Light absorption levels of from 1 to 100 microwatts per exposed cubic feet of gas are effective in conversion of formaldehyde to lesser toxic byproducts. The preferred intensity of UV radiation in Stage I control results in the formation of formyl radical (HCO) and hydrogen radical (H·). Excessive irradiation levels would be expected to form free radical byproducts from formaldehyde, which is preferably minimized by establishing the optimum UV treatment conditions, e.g., gas volume, temperature, VOC concentrations, and residency time estimated or measured in the irradiating zones. The residence time of gas in Stage I is recommended at approximately 1 to 10 seconds.

The formaldehyde that is not collected in the adsorption step of Stage I remains in the efflent gas stream which is directed through the high efficiency particulate matter control device. The gas phase formaldehyde in the effluent gas stream exiting the particulate matter control device is exposed to TV radiation in the spectral range of 220 to 370 nanometers to photochemically oxidize the formaldehyde. The direct photolyic oxidation of formaldehyde remaining in the effluent gas stream from particulate matter control device is termed Stage II control.

The Stage II photoreactor, generally comprises a structural housing which surrounds and/or supports a filtration zone, an inlet port for incoming particulate matter laden gas, an outlet port for filtered gas, and within the filtration zone, a particulate matter control device which retains particulate solids, is gas permeable. Filtered gas from the filtration zone flows in proximity to radiation emitting devices within the downstream zone where photochemical conversion of formaldehyde occurs.

Referring to FIG. 1, wherein like numerals depict like features or components, there is shown therein a multi-stage system that comprises a particulate matter adsorbent storage vessel 1 receiving particulate adsorbent material in a generally dispersible and pumpable form. An adsorbent pumping or conveying device 2 transfers the particulate matter adsorbent to an injection nozzle 3 located in the effluent gas stream duct 4 carrying gas effluent from the industrial process. A high efficiency particulate matter control device 5, depicted in FIG. 1 as a fabric filter assembly comprises a series of spaced apart filter bags 18 and intervening downstream chamber spaces 19. Filter bags 18 retain particulate solids which drop to a hopper 14 and are removed by a particulate solids conveying system 6. Particulate solids containing adsorbed formaldehyde are conveyed to a desorption vessel 7. A separate heated gas stream, heated by burner 13 is passed through the desorption vessel 7 to desorb formaldehyde and the elevated formaldehyde level in the gas is processed in photochemical reactor 8 equipped with UV lamps 11. In practice, the temperature of the gas stream passing through reactor 8 is typically in a range of from 200° F. to 500° F. Preferably, the temperature within Stage I of the process or of the gas stream passing through reactor 8 is maintained within the range of approximately 2000 to 400° F. The gas stream passing through reactor 8 is sometimes referred to as a hot gas stream. The term "hot gas stream" as used herein generally means that the temperature of the gas is at least 200° F. Irradiated gas exiting reactor 8 flows to a wet scrubber 9, exits the scrubber and is drawn by centrifugal fan 10 to stack 23.

The series of UV lights or lamps 11 are mounted in or protruding through the walls of photochemical reactor 8 in Stage I. Lights 11 are oriented to irradiate the gas as it enters photochemical reactor 8. Disposed around the lights 11 is a cooling chamber integral with lamp housing 12. Air having a temperature which provides cooling, such as ambient air or air recycled from a portion of a gas stream is directed through the cooling chamber 12 to maintain the temperature surrounding lamps 11. Burner 13 can be fired with natural gas or an alternative source of hot gas, such as an alkali bypass stream commonly available in cement pyroprocessing plants.

With reference to FIG. 1, Stage II control includes a housing 16 disposed above the high efficiency particulate matter control device 5. Located in the housing 16 are a set of lamps 15. In Stage II the frequency of radiation of the filtered gas should be in a range of from 220 to 370 nanometers, preferably from 250 to 320 nanometers. The lamps 15 should have an intensity selected so as to provide about 200 to 1,000 microwatts/cm$^2$ measured at 254 nanometers and 500 to 10,000 microwatts/cm$^2$ measured at 360 nanometers resulting in light absorption levels of from 1 to 100 microwatts per cubic feet of irradiated gas. A recommended residency time for Stage II irradiation is approximately 2 to 12 seconds. Preferably UV lamps are provided just beyond the particulate matter control device, proximate to the filtered gas as it exits the particulate matter control device. The temperature of irradiated gas passing underneath the lamps 15 can be held in a range of from 200° to 700° F. and is preferably maintained in a range of from 200° to 400° F. These temperature ranges may be varied from the above suggested range and yet provide effective treatment of gas, depending on factors which will be apparent to one of ordinary skill given the compositional and process parameters actually encountered.

The high efficiency particulate matter control device 5 includes a filter room or filter chamber 17. Disposed within the filter room 17 is a series of filter bags 18. It is readily appreciated that the filtration function performed within the filter room 17 can be carried out with any of the aforementioned high efficiency particulate matter removal devices, including, for example, the aforementioned electrostatic precipitators, reverse gas fabric filters, and pulse jet fabric filters. In a preferred embodiment, filter bags 18 comprise elongated fabric filter bags with each filter bag including a gas inlet formed about the lower portion of each of the filter bags. Disposed between the respective filter bags 18 are voids defining air spaces 19. The gas stream entering the filter room 17 is directed upwards into and through the filter bags 18. The gas stream exits the respective filter bags 18 along their lengths and will flow upwardly through the void spaces 19 between the respective filter bags 18.

The UV lights 15 are positioned above the upper terminal ends of the bag filters 18, and aligned such that they are directed downwardly in the open spaces 19. Thus, as the gas stream exits the filters 18 and moves upwardly through the spaces 19, the downwardly directed irradiation from lights 15 maximally contact the filtered gas stream. In addition, once the gas stream clears the upper terminal portions of the filters 18, the directional flow of gas is changed as it flows to the outlet port located at 20.

Connected to the high efficiency particulate matter control device 5 is an outlet duct 21 which junctions to a fan 22 which is operative to expel and direct the filtered, irradiated gas stream into stack 23. As an option, there is provided a series of UV lights at 24 operating in a spectral range above 220 nanometers. This set of stack mounted lights accelerate the photolytic destruction of formaldehyde that occurs naturally due to sunlight when the gas stream is expelled from the stack.

It is contemplated that the lamps or lights 15 are advantageously selected so as to provide an intensity of 200 to 2000 microwatts per square centimeter measured at 254 nanometers and 1,000 to 20,000 microwatts per square centimeter measured at 360 nanometers and thereby result in light absorption levels of 1 to 100 microwatts per actual cubic foot of gas treated. It is appreicated and within the spirit and scope of the invention to establish operable settings of light intensity to avoid the formation of photochemical free radical reaction byproducts.

The residency time in reactor 8 can be varied, but under typical conditions encountered, the residency time of the gas stream in reactor 8 of approximately 1 to 10 seconds is adequate under a proper UV lamp array. It may be desirable to limit the residence time in the irradiation chamber to avoid the formation of photochemical-free radical reaction by products.

The chemical reactions involved in Stage I of the ADPO system are summarized below.

| STAGE I REACTIONS | |
|---|---|
| Formaldehyde Adsorption and Desorption | |
| HCHO + Adsorbent ⇌ HCHO on particle | Reaction 1 |
| Adsorbed HCHO on particle ⇌ HCHO (gas) + Adsorbent particle | Reaction 2 |
| Formaldehyde Photolysis | |
| HCHO + hv (220–370 nanometers) → H + HCO | Reaction 3 |
| HCHO + hv (220–370 nanometers) → $H_2$ + CO | Reaction 4 |
| Formaldehyde Reactions with Other Photochemically Generated Species | |
| OH + HCHO → $H_2O$ + HCO | Reaction 5 |
| O + HCHO → HO + HCO | Reaction 6 |
| $HO_2$ + HCHO → $H_2O_2$ + HCO | Reaction 7 |
| Formyl Radical Reactions | |
| HCO + $O_2$ ⇌ CO + $H_2O$ | Reaction 8 |
| HCO + $O_2$ + M- → $HCOO_2$ + M | Reaction 9 |
| Peroxyformyl Radical and Formate Radical Reactions | |
| $HCOO_2$ + NO → $HCO_2$ + $NO_2$ | Reaction 10 |
| $HCO_2$ → H + $CO_2$ | Reaction 11 |
| $HCO_2$ + $O_2$ → $HO_2$ + $CO_2$ | Reaction 12 |
| Nitrogen Oxides Photolysis | |
| $NO_2$ + hv (270–430 nanometers) → $O(^3P)$ + NO | Reaction 13 |
| $O(^3P)$ + $O_2$ → $O_3$ | Reaction 14 |
| $O_3$ + NO ⇌ $O_2$ + $NO_2$ | Reaction 15 |
| Ozone Photolysis | |
| $O_3$ + hv (250–306 nanometers) → $O(^1D)$ + $O_2(\Delta_g)$ | Reaction 16 |
| $O_3$ + hv (306–350 nanometers) → $O(^1D)$ + $O_2(^3\Sigma_g)$ | Reaction 17 |
| $O_3$ + hv (450–700 nanometers) → $O(^3P)$ + $O_2$ | Reaction 18 |
| Excited Oxygen Reactions | |
| $O(^1D)$ + $H_2O$ → 2HO | Reaction 19 |
| $O(^1D)$ + $H_2O$ → $O(^3P)$ + $H_2O$ | Reaction 20 |
| Nitrogen Oxides and Hydrogen Peroxide Photolysis | |
| $N_2O_4$ + hv (250–310 nanometers) → NO + $NO_2$ + $O(^3P)$ | Reaction 21 |
| $HNO_2$ + hv (<400 nanometers) → HO + NO | Reaction 22 |
| $HNO_3$ + hv (<330 nanometers) → HO + $NO_2$ | Reaction 23 |
| $H_2O_2$ + hv (<370 nanometers) → 2HO | Reaction 24 |
| Nitrogen Oxide Reactions | |
| 2NO + $O_2$ ⇌ 2$NO_2$ | Reaction 25 |
| $NO_2$ + NO + $H_2O$ → 2$HNO_2$ | Reaction 26 |
| 2$HNO_2$ → $NO_2$ + NO + $H_2O$ | Reaction 27 |
| HO + $NO_2$ (+M) → $HONO_2$ (+M) | Reaction 28 |
| HO + NO + M → $HNO_2$ + M | Reaction 29 |
| HO + HO ⇌ $H_2O_2$ | Reaction 30 |
| Carbon Monoxide Chain Reactions | |
| HO + CO → H + $CO_2$ | Reaction 31 |
| H + $O_2$ + M → $HO_2$ + M | Reaction 32 |
| $HO_2$ + NO → HO + $NO_2$ | Reaction 33 |

The chemical reactions involved in Stage II of the ADPO system are summarized below.

| STATE II REACTIONS | |
|---|---|
| Formaldehyde Photolysis | |
| HCHO + hv (220–370 nanometers) → H + HCO | Reaction 1 |
| HCHO + hv (220–370 nanometers) → $H_2$ + CO | Reaction 2 |
| Formaldehyde Reactions with Other Photochemically Generated Species | |
| OH + HCHO → $H_2O$ + HCO | Reaction 3 |
| O + HCHO → HO + HCO | Reaction 4 |
| $HO_2$ + HCHO → $H_2O_2$ + HCO | Reaction 5 |
| Formyl Radical Reactions | |
| HCO + $O_2$ → CO + $H_2O$ | Reaction 6 |
| HCO + $O_2$ + M → $HCOO_2$ + M | Reaction 7 |
| Peroxyformyl Radical and Formate Radical Reactions | |
| $HCOO_2$ + NO → $HCO_2$ + $NO_2$ | Reaction 8 |
| $HCO_2$ → H + $CO_2$ | Reaction 9 |
| $HCO_2$ + $O_2$ → $HO_2$ + $CO_2$ | Reaction 10 |
| Nitrogen Oxides Photolysis | |
| $NO_2$ + hv (270–430 nanometers) → $O(^3P)$ + NO | Reaction 11 |
| $O(^3P)$ + $O_2$ → $O_3$ | Reaction 12 |
| $O_3$ + NO → $O_2$ + $NO_2$ | Reaction 13 |
| Ozone Photolysis | |
| $O_3$ + hv (250–306 nanometers) → $O(^1D)$ + $O_2(\Delta_g)$ | Reaction 14 |
| $O_3$ + hv (306–350 nanometers) → $O(^1D)$ + $O_2(^3\Sigma_g)$ | Reaction 15 |
| $O_3$ + hv (450–700 nanometers) → $O(^3P)$ + $O_2$ | Reaction 16 |
| Excited Oxygen Reactions | |
| $O(^1D)$ + $H_2O$ → 2HO | Reaction 17 |
| $O(^1D)$ + $H_2O$ → $O(^3P)$ + $H_2O$ | Reaction 18 |
| Nitrogen Oxides and Hydrogen Peroxide Photolysis | |
| $N_2O_4$ + hv (250–310 nanometers) → NO + $NO_2$ + $O(^3P)$ | Reaction 19 |
| $HNO_2$ + hv (<400 nanometers) → HO + NO | Reaction 20 |
| $HNO_3$ + hv (<330 nanometers) → HO + $NO_2$ | Reaction 21 |
| $H_2O_2$ + hv (<370 nanometers) → 2HO | Reaction 22 |
| Nitrogen Oxide Reactions | |
| 2NO + $O_2$ → 2$NO_2$ | Reaction 23 |
| $NO_2$ + NO + $H_2O$ → 2$HNO_2$ | Reaction 24 |
| 2$HNO_2$ → $NO_2$+ NO + $H_2O$ | Reaction 25 |
| HO + $NO_2$ (+M) → $HONO_2$ (+M) | Reaction 26 |
| HO + NO + M → $HNO_2$ + M | Reaction 27 |
| HO + HO → $H_2O_2$ | Reaction 28 |
| Carbon Monoxide Chain Reactions | |
| HO + CO → H + $CO_2$ | Reaction 29 |
| H + $O_2$ + M → $HO_2$ + M | Reaction 30 |
| $HO_2$ + NO → HO + $NO_2$ | Reaction 31 |
| Organic Compound Reactions | |
| $O_3$ + RHC=CHR → RHC—OOO—CHR (C-to-C bond) | Reaction 32 |
| $O_3$ + RHC=CHR → $RCHO_2$ + RCHO | Reaction 33 |
| $RO_2$ + NO → RO + $NO_2$ | Reaction 34 |

-continued

STATE II REACTIONS

| | |
|---|---|
| $R + O_2 (+M) \rightarrow RO_2 (+M)$ | Reaction 35 |
| $HO + RH \rightarrow H_2O + R$ | Reaction 36 |

With reference to FIG. 1, in Stage II of the ADPO process, the lights 15 that irradiate the filtered gas stream that passes through the high efficiency particulate matter control system 5 are advantageously selected or adapted to emit light within the spectral range of 220 to 370 nanometers. The invention further contemplates that the most efficient spectral range for the lights 15 would be 250 to 320 nanometers. It is contemplated that the lamps or lights 15 would be selected so as to provide an intensity of 200 to 1,000 microwatts per square centimeter measured at 254 nanometers and 500 to 10,000 microwatts per square centimeter measured at 360 nanometers and thereby result in light absorption levels of 1 to 100 microwatts per actual cubic foot of gas treated. Further, it is contemplated that the residency time of the filtered gas stream within chamber 5 would be approximately 2 to 12 seconds. It is desirable to limit the light intensities and gas residence times in the irradiation to minimize the formation of photochemical free radical reaction byproducts. The temperature of the gas stream passing through Stage II and chamber 5 is effectively treated at a temperature in the range from approximately 200° to 700° F. Preferably, the temperature of the gas is treated advantageously at a temperature of approximately 200° to 400° F. Of course, the gas temperature ranges in the zones containing radiation for both Stage I and Stage II control may vary, and different temperatures may be established to be effective and even preferable depending upon the makeup and nature of the gas stream and other factors encountered in practice.

As noted above, the gas stream being treated in chamber 5 is a filtered gas stream, the filtration being readily accomplished by the series of bag filters 18 disposed within the filter room 17. While the primary function of the filter system is to remove filterable particulate matter, the filter system also provides for the high efficiency collection of adsorbed formaldehyde, most of which is present as physically adsorbed onto the particulate solid material. During movement of the gas effluent through the filter bags 18, some vapor phase mass transfer of formaldehyde to the particulate matter laden dust cake may occur.

Reducing Formaldehyde in a Gas Stream Produced by a Cement Manufacturing Facility The process described above for reducing or minimizing formaldehyde in an industrial gas stream can be applied to many industrial processes. One particular application of the present process and system is to cement manufacturing facilities that, in some case, have a tendency to produce formaldehyde in very low concentrations of 1 to 40 ppm.

Figure 2:
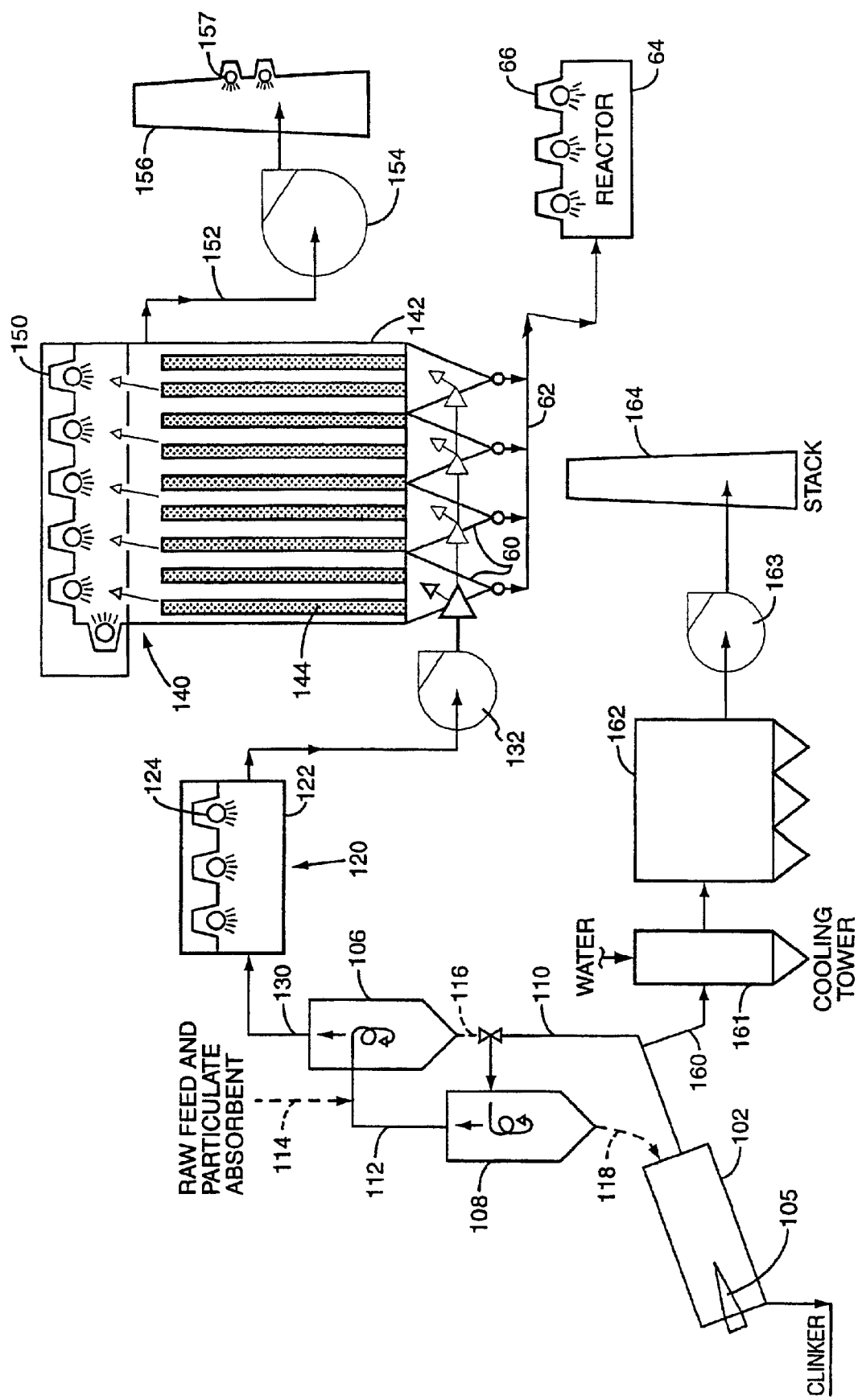
FIG. 2 is a schematic illustration of the application of the ADPO process for the removal of formaldehyde compounds from the effluent gas stream of a portland cement pyroprocessing system.

The components of a conventional cement or portland cement manufacturing facility relevant to the invention are depicted in FIG. 2, which is a schematic illustration of effluent streams downstream of a kiln. Aspects of a conventional cement manufacturing facility not illustrated are well known and are beyond the scope of this disclosure. A cement manufacturing facility typically comprises a pyroprocessing system including a rotary kiln 102 having a burner 105 disposed in the outlet end thereof, and a preheater tower. In the preheater tower there is included a series of cyclones, such as illustrated at 106 and 108.

In conventional fashion, a gas stream is generated in the kiln 102. The gas stream moves from the kiln 102 through a gas duct 110 to the lower cyclone 108. Gas entering cyclone 108 may be directed through portions of the cyclone and ultimately will exit cyclone 108 via duct 112. Duct 112 leads to the second cyclone 106. The gas stream will enter cyclone 106 via duct 112 and will, in conventional fashion, be directed to various areas within the cyclone. Ultimately, the gas stream will exit cyclone 106 and enter main duct 130 that ultimately leads from cyclone 106 to a fan 132. There is an alkali bypass stream that is formed by withdrawing a portion of the main effluent gas stream exiting the kiln 102. This alkali bypass stream is typically treated in a separate gas cooling tower 161 and a high efficiency particulate matter control device 162. A fan 163 pulls the alkali bypass stream from the particulate matter control device 162 to a stack 164. The purpose of the alkali bypass stream is to relieve the system of salt.

Cyclones 106 and 108 are adapted to receive a conventional raw feed, typically limestone, and in some cases, additives such as clay and sand. The raw feed is typically directed through a feed line 114 into duct 112 carrying the gas stream from cyclone 108 to cyclone 106. The raw feed entering duct 112 will mix with the gas stream and be directed into cyclone 106 and will gravitate downwardly through cyclone 106 while being preheated. The raw feed will exit cyclone 106 through feed line 116. FIG. 2 depicts feed a line 116 that joins the gas stream duct 110. There the raw feed will mix with the gas stream traveling in duct 110 and be directed into the lower cyclone, cyclone 108. Once in cyclone 108, the raw feed will gravitate downwardly through the cyclone and, in the process, will be preheated therein. Ultimately, the preheated raw feed will exit cyclone 108 into feed line 118 that carries the preheated raw feed to kiln 102. In kiln 102, the raw feed will be subjected to heating to approximately 2,800° F. and, during this course, there will be produced cement clinker that will be directed out the output end of kiln 102. The gas stream exiting cyclone 106 is directed into duct structure 130 that leads from the cyclone 106 ultimately to fan 132.

It is appreciated that there are numerous variations among the basic components of the cement manufacturing facility. For example, there can be any number of cyclones that form a part of the pyroprocessing system of a cement plant. In addition, and in the way of an example, some cement manufacturing plants do not include preheaters. The APDO process herein is readily adapted to destroying formaldehyde in preheater or preheater-precalciner type portland cement plant. Accordingly, the illustration discussed above and shown in FIG. 2 is principally for explanation purposes.

Also, with the raw feed that is directed into line 112, it is contemplated that a particulate adsorbent material of the type previously discussed with respect to the process of FIG. 1, could be mixed with the raw feed and injected into the gas stream passing from cyclone 108 to cyclone 106. In the same manner as described herein before, the particulate adsorbent material would act to adsorb formaldehyde in the gas stream.

Disposed between cyclone 106 and fan 132 is a photochemical reactor indicated generally by the numeral 120. Reactor 120 includes a housing or duct structure 122 through which a gas stream passes, that is the gas stream moving from cyclone 106 to fan 132. Within the reactor 120 there is provided a series of UV lamps 124. Reactor 120 functions to remove formaldehyde from the gas stream passing therethrough in much the same manner as described in the Stage I process discussed with respect to FIG. 1. There are slight differences between how this initial formaldehyde removing process is carried out compared to that illustrated in FIG. 1. In the FIG. 1 process, the particulate matter having the adsorbed formaldehyde thereon, was removed form the intial gas stream and directed into a second gas stream. In this case, that is the case of FIG. 2 and the cement manufacturing facility, the particulate matter having the adsorbed formaldehyde thereon may undergo a desorption process prior to reaching the reactor 120. Thus, at least some of the formaldehyde will be desorbed prior to reaching the reactor 120. Therefore, the reactions that take place in reactor 120 are referred to as a Stage I process.

As the gas stream passes through reactor 120 it is contemplated that the gas stream would be maintained within a temperature range of approximately 200 to 400° F. It is contemplated that the lights 124 utilized in the reactor 120 would radiate light within a spectral range of 220 to 370 nanometers. This would entail UV light. The number of lights 124 used in reactor 120 could vary based upon the flow rate of the gas stream, the chemical make-up of the gas stream and other factors. However, it is contemplated that the lamps 124 would be selected so as to provide an intensity of 200 to 2,000 microwatts per square centimeter measured at 254 nanometers and 1,000 to 20,000 microwatts per square centimeter measured at 360 nanometers and thereby result in light absorption levels of 1 to 100 microwatts per actual cubic foot of gas treated. The light emitted by the lamps 124 would be absorbed by the formaldehyde and would typically result in the formation of hydrogen radicals and formyl radicals. It should be noted that the light intensity can be limited to avoid the formation of photochemical free radical reaction byproducts. The concentration of nitrogen oxides in the reactor 120 and in the gas stream is advantageously minimized under control conditions.

The gas stream exiting the fan 132 is directed to a high efficiency particulate matter filter chamber 140 similar to the chamber 5 shown in FIG. 1 and discussed above. In any event, after the gas stream has passed through the individual filters 144 that form a part of the particulate matter filter, the filtered gas stream is exposed to another series of lights or lamps 150. This is essentially Stage II treatment. Details of the particulars for Stage II treatment will not be repeated here as they are essentially the same as discussed above with respect to Stage II and as shown in FIG. 1. Like in the process discussed above and shown in FIG. 1, Stage II treatment in the case of the cement manufacturing facility focuses on the gas stream after particulate matter has been removed by a filtering process.

From Stage II, as shown in FIG. 2, the gas stream is directed through line 152 to a fan 154 which directs the gas stream to a stack 156. As noted with respect to the process of FIG. 1, the gas stream can be further treated with lamps 157 in the stack 156.

With respect to the process for manufacturing cement as shown in FIG. 2, it is possible to treat the formadehyde that might be adsorbed on the particulate matter filtered by the filter system 140. In this regard, as shown in FIG. 2, particulate material is filtered by the filter bags or filter elements 144. The filtered particulate matter is directed downwardly onto a conveyor 62 which conveys the filtered particulate matter into a reactor 64 including a series of lamps 66. It is appreciated that the lamps 66 can be selected to provide UV light and to emit radiation in the spectral range of 220 to 270 nanometers. Further, the reactor 64 can be designed and controlled to maintain conditions therein that are similar to the conditions discussed herein above with respect to Stage I treatment. Between the conveyor 62 and the reactor 64, a desorption vessel or reactor can be provided. Thus, the formaldehyde adsorbed on the particulate matter that is discharged from the filtration system 140 may be subjected to desorption such that the UV light emitted by lamps 66 is operative to convert the formaldehyde within the gas stream passing through the reactor 64 to a less hazardous chemical form. Further, in the case of providing a desorption vessel or reactor, it is appreciated that a second gas stream comparable to that illustrated in FIG. 1 and discussed above can be provided for the purpose of desorbing the formaldehyde associated with the particulate matter filtered from the gas stream.

Empirical Study of the Formaldehyde Reducion by Treatment of UV Radiation

An empirical study of the photochemical reduction of formaldehyde has been performed by the inventors. A gas composition was produced to simulate a typical cement manufacturing industrial gas stream. A gas stream of 3 liters per minute consisting of formaldehyde, nitric oxide, carbon monoxide, and air was treated with UV radiation. Formaldehyde concentration were measured with and without UV radiation treatment to determine reduction efficiency. The light spectra included 220 to 370 nm and the light intensity was varied to establish a reduction efficiency range. The results are provided in table 1.

TABLE 1

Photochemical Reduction Results

| Formaldehyde[1] (ppm) | NO (ppm) | CO (ppm) | Oxygen (%) | Reduction Efficiency (%) | Residence Time (Seconds) |
| --- | --- | --- | --- | --- | --- |
| 40 | 318 | 450 | 3.5 | 50 | 25 |
| 15 | 350 | 450 | 2.8 | 93 | 25 |
| 25 | 300 | 418 | 4.8 | 80–92 | 25 |
| 15 | 295 | 280 | 8.0 | 0–80 | 7 |
| 23 | 200 | 200 | 11.7 | 57–83 | 7 |

[1]Untreated concentration

From the foregoing discussion, it is appreciated that the present invention presents an effective photochemical process for reducing or minimizing formaldehyde in an industrial gas stream. Essentially, the photochemical process entails the adsorption of formaldehyde and its collection as adsorbed material on the surfaces of particulate matter. The solids from the high efficiency particulate matter control device are subjected to high temperature gas to desorb the weakly bound formaldehyde. The concentrated stream containing formaldehyde is then photochemically oxidized in a reactor. Incomplete removal of formaldehyde from the main kiln gas effluent through adsorption onto particulate solids is treated in the separate photochemical Stage II system of the direct photolysis of formaldehyde exiting the high efficiency particulate matter control device.

the present invention may, of course, be carried out in other specific ways than those herein set forth departing from the scope and the essential characteristics of the invention. The present embodiments are therefore to be construed in all aspects as illustrative and not restrictive, and all changes coming within the meaning and equivalency range of the appended claims are intended to be embraced therein.

What is claimed is:

1. A method of destroying formaldehyde in an gas stream comprising the steps of adsorbing formaldehyde on particulate solids entrained in a gas stream, removing an adsorbent to form a filtered gas stream, transferring formaldehyde by desorbing the formaldehyde from said particulate solids into a separate gas stream, and irradiating with light concentrated formaldehyde in said separate gas stream to convert the formaldehyde to a less hazardous chemical form.

2. The method of claim 1 wherein the separate gas stream is a hot gas stream.

3. The method of claim 2 wherein the concentrated formaldehyde is subjected to irradiation for a residency time of approximately 1 to 10 seconds.

4. A method of producing cement and reducing the concentration of formaldehyde in a resulting industrial gas stream comprising: directing raw feed into a pyroprocessing system of a cement manufacturing facility and through a kiln that forms a part of the pyroprocessing system to produce cement clinker; heating the pyroprocessing system which gives rise to the resulting industrial gas stream; and reducing the concentration of formaldehyde in the resulting gas stream according to the method of claim 1.

5. The method of claim 4 further including irradiating the filtered gas stream to convert formaldehyde therein to a less hazardous chemical form.

6. The method of claim 4 including irradiating the concentrated formaldehyde in the separate gas stream with light falling within the spectral range of 220 to 370 nanometers.

7. The method of claim 6 wherein the concentrated formaldehyde in the gas stream is exposed to the irradiation for a residency time of approximately 1 to 10 seconds.

8. The method of claim 4 wherein the separate gas stream is a hot gas stream.

9. The method of claim 1 wherein irradiating the formaldehyde converts the formaldehyde to $CO_2$.

10. The method of claim 9 wherein in converting the formaldehyde to $CO_2$, the process forms intermediate compositions selected from the group including formyl radicals, peroxyformyl radicals and formate radicals.

11. The method of claim 1 wherein said filtered gas stream is irradiated with light falling within the spectral range of 220 to 370 nanometers.

12. The method of claim 1 wherein the step of removing an adsorbent from the gas stream includes directing said stream through a series of spaced-apart elongated filters wherein the filtered gas stream is emitted along the length of the elongated filters, and wherein the filtered gas stream exiting bags is irradiated by direct photolysis to reduce the concentration of formaldehyde.

13. The method of claim 12 wherein the elongated filters are vertically oriented and the filtered gas stream flows upwardly through a free space between the filters, and wherein the filtered gas stream is irradiated as it moves upwardly through the free space between the filters.

14. The method of claim 13 including a step of irradiating the gas stream, prior to filtering, with light falling within the spectral range of 220 to 370 nanometers.

15. The method of claim 1 wherein the step of removing an adsorbent from the gas stream includes directing the gas stream through a series of electrostatic precipitation fields.

16. A method of reducing the concentration of formaldehyde in a gaseous effluent stream comprising:
 a. in a Stage I treatment, combining a flowing gaseous effluent stream with finely divided particulate solids by dispersing the finely divided solids into said flowing stream, adsorbing formaldehyde on said finely divided solids from the gaseous effluent stream, filtering the gaseous effluent stream to collect said solids, directing a separate gas stream past said collected solids, desorbing formaldehyde from the solids, and irradiating with light the separate gas stream, and
 b. in a Stage II treatment, treating said gaseous effluent stream which has been filtered by direct photolysis of formaldehyde.

17. The method of claim 16 wherein said separate gas stream in Stage I is with irradiated light that emits radiation in the spectral range of 220 to 370 nanometers and wherein in Stage II, said gaseous effluent gas stream is irradiated with light that emits radiation in the spectral range of 220 to 370 nanometers.

18. A method of reducing the concentration of formaldehyde in a gaseous effluent stream emitted by a cement manufacturing facility, comprising adsorbing formaldehyde on particulate adsorptive solids dispersed into said gaseous effluent stream, collecting said particulate adsorptive solids, desorbing formaldehyde from the particulate solids under a separate flow of hot gas, and an irradiating said hot gas with light so as to oxidize the formaldehyde to less toxic chemical forms.

19. The method of claim 18 including the step of directing the gaseous effluent stream from a pyroprocessing section of the cement manufacturing facility, treating the gas steam by removing particulate matter from the gas stream, and irradiating the treated gas stream with light that falls within the spectral range of 220 to 370.

20. The method of claim 19 wherein the light utilized to chemically oxidize formaldehyde emits radiation in the spectral range of 220 to 370 nanometers.

21. A method of producing cement and reducing the concentration of formaldehyde in a resulting gas stream comprising:
 a. directing a raw feed into a pyroprocessing system of a cement manufacturing facility;
 b. directing the heated raw feed through at least one kiln of the pyroprocessing system to produce cement clinker;
 c. heating the pyroprocessing system and directing the resulting gas stream through the pyroprocessing system;
 d. directing the gas stream emitted from the pyroprocessing system to a zone where particulate solids are injected into the stream,
 e. adsorbing formaldehyde on the particulate solids;
 f. removing the particulate solids having the adsorbed formaldehyde from the gas stream;
 g. directing the particulate solids having the adsorbed formaldehyde to a separate gas stream;
 h. desorbing formaldehyde from the particulate solids in the separate gas stream; and
 i. irradiating with light the desorbed formaldehyde to oxidize formaldehyde to at least a less toxic form.

22. The method of claim 21 including irradiating the gas stream with light after the particulate solids having the adsorbed formaldehyde have been removed from the gas stream so as to treat additional formaldehyde within the gas stream so as to oxidize the additional formaldehyde to at least a less toxic form.

23. The method of claim 21 wherein the separate gas stream is irradiated with light which emits radiation within the spectral range of 220 to 370 nanometers.

24. The method of claim 21 wherein the particulate solids having the adsorbed formaldehyde are removed from the gas stream by directing the gas stream through a plurality of spaced-apart filter bags.

25. A method of reducing the concentration of formaldehyde in an industrial production process that emits a gas stream containing formaldehyde, comprising:

a. introducing solid particulates into the gas stream, the solid particulates containing an organic component for adsorbing formaldehyde;

b. adsorbing formaldehyde on the solid particulates;

c. recovering the adsorbed solid particulates from the gas stream;

d. directing the recovered adsorbed solid particulates to a second stream; and e. oxidizing the absorbed formaldehyde in the second gas stream by direct photochemical oxidation by irradiating the second gas stream with UV light.

26. The method of claim 25 including returning desorbed solid particulates to the industrial production process.

27. The method of claim 25 wherein recovering the solid particulates with adsorbed formaldehyde from the gas stream includes filtering the gas stream and producing a filtered gas stream.

28. The method of claim 27 including treating the filtered gas stream to further reduce the concentration of formaldehyde by irradiating with light the filtered gas stream and oxidizing formaldehyde therein to covert the formaldehyde to a less hazardous chemical form.

29. The method of claim 25 including irradiating the absorbed formaldehyde in the second gas stream with light falling within the spectral range of 220 to 370 nanometers.

30. The method of claim 25 wherein the oxidation of formaldehyde in the second gas stream occurs in the absence of an added photocatalyst.

* * * * *